(12) United States Patent
Krikorian et al.

(10) Patent No.: US 6,778,137 B2
(45) Date of Patent: Aug. 17, 2004

(54) EFFICIENT WIDEBAND WAVEFORM GENERATION AND SIGNAL PROCESSING DESIGN FOR AN ACTIVE MULTI-BEAM ESA DIGITAL RADAR SYSTEM

(75) Inventors: Kapriel V. Krikorian, Oak Park, CA (US); Robert A. Rosen, Simi Valley, CA (US)

(73) Assignee: Raytheon Company, Waltham, MA (US)

( * ) Notice: Subject to any disclaimer, the term of this patent is extended or adjusted under 35 U.S.C. 154(b) by 49 days.

(21) Appl. No.: 10/106,335

(22) Filed: Mar. 26, 2002

(65) Prior Publication Data

US 2003/0184472 A1 Oct. 2, 2003

(51) Int. Cl.[7] .................................................. H01Q 3/24
(52) U.S. Cl. ........................ 342/372; 342/371; 342/373
(58) Field of Search ................................ 342/371, 372, 342/373, 368

(56) References Cited

U.S. PATENT DOCUMENTS

| | | | | |
|---|---|---|---|---|
| 4,532,517 A | * | 7/1985 | LaBerge et al. | 343/372 |
| 4,814,773 A | * | 3/1989 | Wechsberg et al. | 342/368 |
| 4,965,602 A | * | 10/1990 | Kahrilas et al. | 342/372 |
| 6,404,821 B1 | * | 6/2002 | Dent | 375/267 |
| 6,624,783 B1 | * | 9/2003 | Rabideau | 342/195 |

* cited by examiner

Primary Examiner—Dao Phan
(74) Attorney, Agent, or Firm—Leonard A. Alkov

(57) ABSTRACT

An efficient digital wideband waveform generation and signal processing system for multi-beam electronically scanned antenna array (ESA) radar systems. The digital waveform generator (50) first produces a series of waveform phase angles corresponding to the phase angles of a common signal to be transmitted by the ESA. Then, for each antenna element, the waveform phase angles are adjusted to steer the beam by adding a time delay and a phase adjustment. A digital signal is then produced for each antenna element by applying a cosine function to the adjusted phase angles. In the illustrative embodiment, this is accomplished using a cosine look-up table (14). Each digital cosine wave is then stored in a serial memory buffer (16A to 16L) in preparation for conversion to digital. Each of digital signals is passed through a digital to analog converter (18A to 18L) and an RF filter (20A to 20L) at each antenna element. The resulting analog signals are each amplified by a power amplifier (22A to 22L), and then sent through a wideband circulator (24A to 24L) to an antenna element (26A to 26L). On receive, at each antenna element (26A to 26L), a wideband linear amplifier (30A to 30L) and an RF filter (32A to 32L) provide rejection of out of band signals while providing amplification and signal conditioning for the following analog to digital converter (34A to 34L). The resulting digital signals (one for each element) are sent through the (36A to 36L) which separate each digital signal into N frequency channels. A digital beam formation unit (38A to 38N) for each frequency channel then forms multiple digital simultaneous beams by combining like frequency channels from each antenna element with an added phase adjustment.

17 Claims, 4 Drawing Sheets

EFFICIENT WIDEBAND WAVEFORM GENERATION AND SIGNAL PROCESSING DESIGN FOR AN ACTIVE MULTI-BEAM ESA DIGITAL RADAR SYSTEM

BACKGROUND OF THE INVENTION

1. Field of the Invention

The present invention relates to radar systems. More specifically, the present invention relates to digital waveform generation and receive beam formation in a multiple beam electronic scan antenna array radar system.

2. Description of the Related Art

Certain radar applications use multiple simultaneous transmit and receive beams to enhance their search rate capability. Using multiple simultaneous beams helps maintain situational awareness and allows advanced processing techniques such as clutter cancellation and improved anti-jam capabilities.

Multiple simultaneous beams can be generated using an electronically scanned antenna array (ESA). An ESA is an array of several individual antenna elements which work together to form a desired overall antenna pattern. Each antenna element radiates a common signal altered in phase. The direction of the antenna beam can be controlled by varying the phase of the signals driving the individual antenna elements. Thus, it is required that the signal along each path between a signal source and the antenna elements have a controlled phase.

Conventionally, ESA use analog antenna manifolds to distribute outgoing signals with the correct phase adjustments to the antenna elements in the transmit mode, and to coherently combine antenna element signal components in the receive mode. Such manifolds include complex circuits such as feed antennas, feed distribution networks, and corporate feeds. These manifolds can get very large and heavy in proportion to the number of elements in the antenna array.

The Butler matrix has been used to feed an antenna array for generating multiple simultaneous beams. The Butler matrix, however, suffers from insufficient bandwidth with respect to current more demanding applications, as well as being an inherently complex and heavy piece of equipment.

Hence, a need exists in the art for a system or method for efficient waveform generation for a multi-beam electronically scanned antenna array that offers wide bandwidth, low cost, and low weight.

SUMMARY OF THE INVENTION

The need in the art is addressed by the efficient digital wideband waveform generation and signal processing design for electronically scanned antenna array (ESA) radar systems of the present invention.

On transmit, a digital waveform generator produces digital forms of the signals to be transmitted by the individual elements of the antenna array. A different signal is produced for each element. Each of these digital signals is passed through a digital to analog converter (D/A) and a radio frequency (RF) filter at each antenna element. The resulting analog signals are each amplified by a power amplifier and then sent through a wideband circulator to an antenna element.

The digital waveform generator first produces a series of waveform phase angles corresponding to the phase of the waveform to be transmitted. These are common to all the antenna elements. Then, for each antenna element, the waveform phase angles are adjusted to steer the beam by adding a time delay and a phase adjustment. A digital signal is then produced for each antenna element by applying a cosine function to the adjusted phase angles. In the illustrative embodiment, this is accomplished using a cosine look-up table. Each digital cosine wave is then loaded into a serial memory buffer and read out to the D/A converters.

On receive, at each antenna element, a wideband linear amplifier and an RF filter provide rejection of out of band signals while providing amplification and signal conditioning for the following analog to digital converter (A/D). The resulting digital signals (one for each element) are sent through digital frequency channelizers. Like frequency channels from each antenna element are then combined to form multiple digital simultaneous beams. As in the transmit chain, the beam formation can be done with a combination of time delays and phase adjustments.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The present invention is an efficient digital wideband waveform generation and signal processing design for electronically scanned antenna array (ESA) radar systems.

Advances in digital technology, particularly the larger bandwidth available on analog to digital (A/D) converters and higher throughput processors, now allow the practical implementation of a digital antenna manifold, i.e. digital waveform generation on transmit, and digital beam forming on receive.

Figure 1:
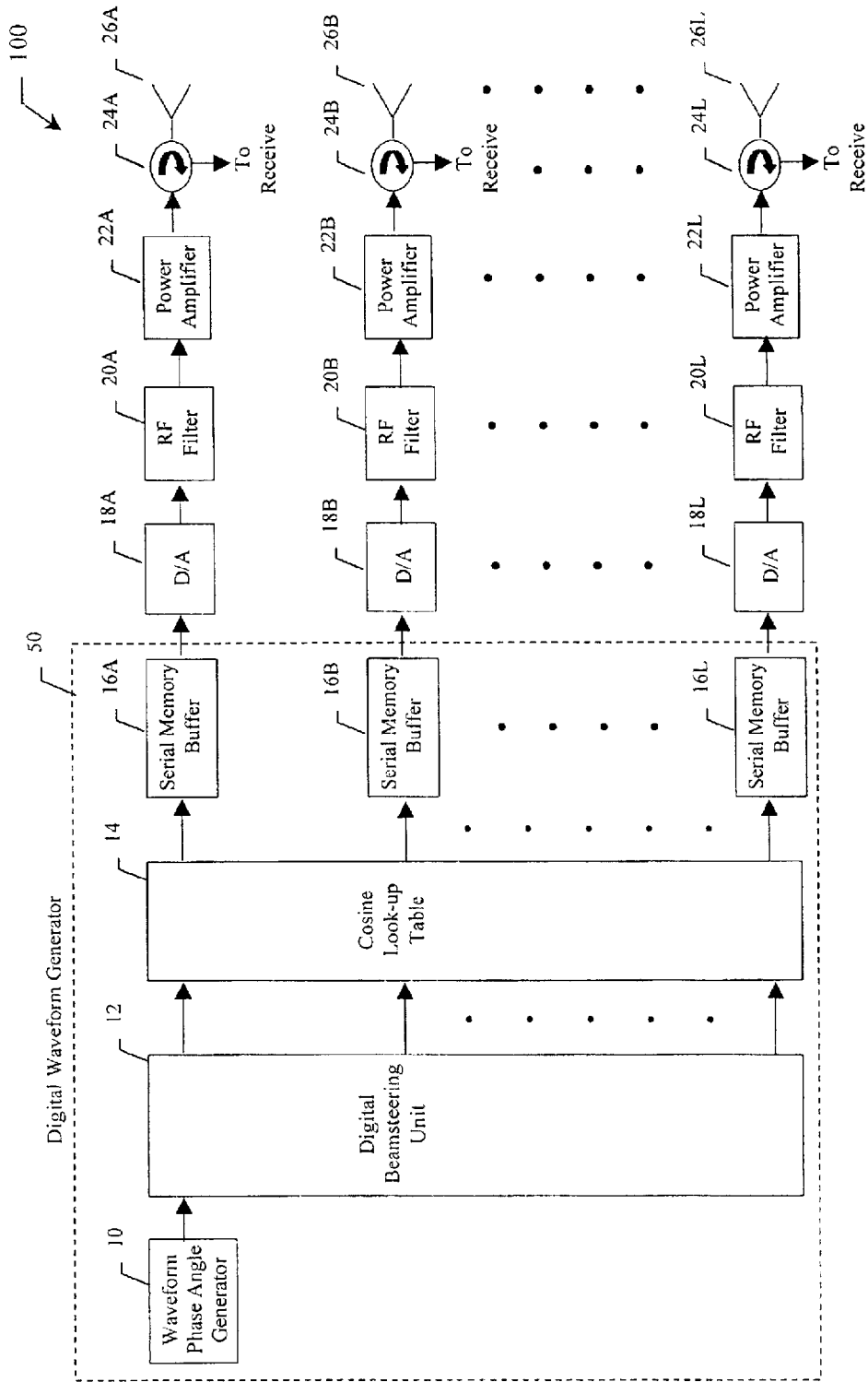
FIG. 1 is a block diagram of a transmit circuit of a wideband multi-beam digital radar designed in accordance with the teachings of the present invention.

FIG. 1 is a block diagram of the transmit circuit 100 of a wideband multi-beam digital ESA radar system designed in accordance with the teachings of the present invention. A digital waveform generator 50 produces digital forms of the signals to be transmitted by the individual elements (26A to 26L) of the antenna array. A different signal is produced for each element. Each of these digital signals is passed through a D/A (18A to 18L) and an RF filter (20A to 20L). The resulting analog signals are each amplified by a power amplifier (22A to 22L), and then sent through a wideband circulator (24A to 24L) to a corresponding antenna element (26A to 26L). The antenna array is comprised of L individual elements (26A to 26L), where L is an integer. In an illustrative example, the antenna array contains 1000 elements, the D/A converters operate at a sampling frequency of 40 GHz, and the transmitted energy has a center frequency of 10 GHz.

Assuming the transmitted signals are to be in the form of cosine (or sine) waves, the digital waveform generator first produces a series of phase angles corresponding to the phase of the waveform to be transmitted. This is performed by a Waveform Phase Angle Generator 10, as shown in FIG. 1. The series of phase angles produced by the Waveform Phase Angle Generator 10 is common to all the antenna elements. Second, the waveform phase angles are adjusted by a Digital Beamsteering Unit 12 to steer the beam by adding a time delay and a phase adjustment for each antenna element (26A to 26L). A series of adjusted phase angles is thus produced for each antenna element (26A to 26L). A digital signal is then produced for each antenna element (26A to 26L) by applying a cosine function to the adjusted phase angles. In the illustrative embodiment shown in FIG. 1, this is accomplished using a Cosine Look-up Table 14. Each digital cosine wave is then loaded into a Serial Memory Buffer (16A to 16L) and read out to the D/A converters (18A to 18L).

The Waveform Phase Angle Generator 10 produces a series of phase angles $\phi(n)$ corresponding to the phase of the signal to be transmitted during a radar pulse. These phase angles $\phi(n)$ are common to all the antenna elements in the array. The Waveform Phase Angle Generator 10 can be implemented by a Direct Digital Synthesizer (DDS) or similar device.

The waveform phase angles $\phi(n)$ are then input to a Digital Beamsteering Unit 12. The Digital Beamsteering Unit 12 adds a time delay and a phase adjustment for each antenna element. The time delay allows uniform beam pointing over a wide bandwidth, and the phase adjustment compensates for the time delay quantization at the center frequency. In order to steer the transmitted radar beam, each antenna element must have a particular phase angle added to the common waveform signal. This is similar to the phase shifts required in an analog beamsteering system except that it's being implemented digitally. A digital delay is also required in order to focus the transmitted beam. Otherwise, the beam will squint with frequency, i.e., edge frequencies will not be pointed in the same direction as the center frequency.

For each element, a different phase adjustment and time delay are combined with the waveform phase angles $\phi(n)$ produced by the Waveform Phase Angle Generator 10 to form adjusted phase angles $\theta_l(n)$ for l=1 to L, where the subscript l indicates which antenna element (26A to 26L) the signal is for and L is the total number of individual elements in the antenna array.

Figure 2:
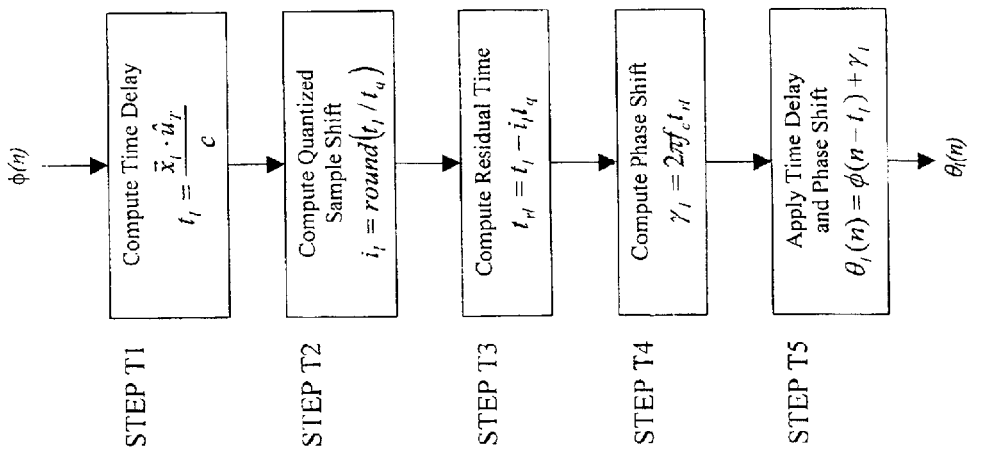
FIG. 2 is a flow chart of a digital beamsteering system designed in accordance with the teachings of the present invention.

FIG. 2 is a flow chart of a Digital Beamsteering Unit 12 designed in accordance with the teachings of the present invention. The input to the Digital Beamsteering Unit 12 is the series of waveform phase angles $\phi(n)$. The outputs are the adjusted phase angles $\theta_l(n)$ for l=1 to L.

First, at Step T1, the time delay ti is computed using the following equation:

$$t_l = \frac{\vec{x}_l \cdot \hat{u}_T}{c} \quad [1]$$

where $\hat{u}_T$ is a unit vector along the transmit beam, $\vec{x}_l$ is the position of antenna element l relative to the antenna array center, and c is the speed of light.

At Step T2, the quantized sample shift ii is computed using the following equation:

$$i_l = \text{round}(t_l/t_q) \quad [2]$$

where $t_q$ is the time quantization of the Waveform Phase Angle Generator 10.

At Step T3, the residual time $t_{rl}$ is computed using the following equation:

$$t_{rl} = t_l - i_l t_q \quad [3]$$

At Step T4, the phase shift $\gamma_l$ is computed for element l:

$$\gamma_l = 2\pi f_c t_{rl} \quad [4]$$

where $f_c$ is the center frequency of the transmitted beam.

Finally, at Step T5, the time delay $t_l$ and the phase shift $\gamma_l$ are applied to the waveform phase angles $\phi(n)$, resulting in an output signal $\theta_l(n)$:

$$\theta_l(n) = \phi(n-t_l) + \gamma_l \quad [5]$$

These steps are repeated for all the antenna elements l=1 to L.

In the preferred embodiment, the Digital Beamsteering Unit 12 is implemented in software. Digital beamsteering can be performed for all antenna elements using a single computer, or it can be done separately for each element, with a separate processor for each element.

FIG. 2 shows an implementation of the Digital Beamsteering Unit 12 whereby the time delays and phase adjustments are calculated. Alternatively, the time delays and phase adjustments can be calculated beforehand and stored in a look-up table, or they can be calculated and stored for certain discrete locations and derived for intermediate locations by interpolation. The Digital Beamsteering Unit 12 can thus be implemented by computation, look-up tables, or a combination of tables and interpolation.

After digital beamsteering is performed, a digital signal $y_l(n)$ is then produced for each antenna element (26A to 26L) by applying a cosine function to each of the series of adjusted phase angles $\theta_l(n)$ for l=1 to L:

$$y_l(n) = \cos[\theta_l(n)] \quad [6]$$

In the illustrative embodiment, this is accomplished using a Cosine Look-up Table 14.

Each digital cosine wave $y_l(n)$ is then loaded into a serial dual memory buffer (16A to 16L) in preparation for conversion to analog. Since the waveform is typically repetitive over several pulses and the beamsteering command is usually fixed for a least 1 millisecond, the serial memory can be updated at a rate significantly lower than 40 GHz.

For each pulse, the serial memory buffers (16A to 16L) are read out to the D/A converters (18A to 18L) at the sampling rate (40 GHz in the example). An RF filter (20A to 20L) follows each D/A (18A to 18L) to reject the out of band frequencies generated by the D/A. Power amplification is then performed by the power amplifiers (22A to 22L) and the signal is sent through wideband circulators (24A to 24L) to the antenna elements (26A to 26L). The power amplifiers and circulators are common to ESA systems.

With the digital system of the present invention, only a D/A converter, RF filter, and power amplifier are required for each element. The digital waveform generator can be implemented using a single computer. As would be known to one of ordinary skill in the art, a high-speed clock signal is also required to drive all the digital equipment at each element. The complex antenna manifold of an analog system is no longer needed.

Figure 3:
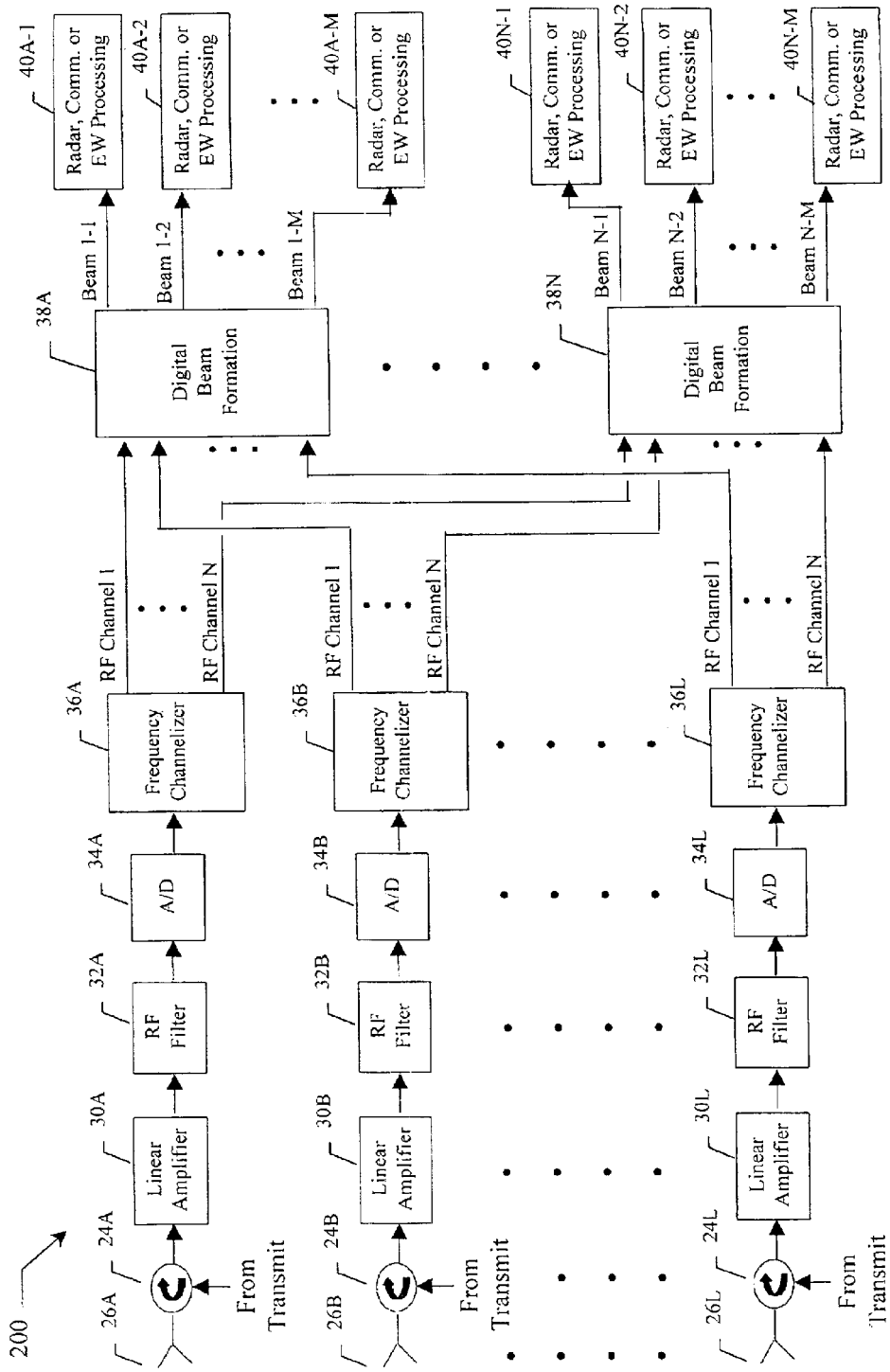
FIG. 3 is a block diagram of a receive circuit of a wideband multi-beam digital radar designed in accordance with the teachings of the present invention.

FIG. 3 is a block diagram of a receive circuit 200 of a wideband multi-beam digital radar designed in accordance with the teachings of the present invention. The transmitted signal is received by antenna elements (26A to 26L) and corresponding circulators (24A to 24L). The received signals are amplified by linear amplifiers (30A to 30L) for each antenna element, followed by RF filters (32A to 32L) which provide rejection of out of band signals, and analog to digital (A/D) converters (34A to 34L) which convert the received analog signals to digital data. After digitization, the subsequent steps can be performed using a single computer, or multiple processors.

The digital data from each antenna element (26A to 26L) is fed to a corresponding frequency channelizer (36A to 36L) which separates each signal into N different frequency bands. For example, assuming the received signal was in the range from 8 GHz to 12 GHz, each frequency band could have a bandwidth of 100 MHz, such that the first frequency channel ranged from 8.0 to 8.1 GHz, the second channel ranged from 8.1 to 8.2 GHz, etc. This can be implemented using a Fast Fourier Transform (FFT). It is understood that one of ordinary skill in the art may choose to do additional things at this step, such as amplitude weighting to reduce sidelobes, zero padding, etc.

After frequency channelization, Digital Beam Formation Units (38A to 38N) take like frequency channels from each antenna element and combine them to form multiple digital simultaneous beams. Digital beam formation is performed separately for each frequency channel. Hence, there are N Digital Beam Formation Units (38A to 38N), where N is the total number of frequency channels. Each Digital Beam Formation Unit (38A to 38N) has L number of inputs and M number of outputs, where L is the total number of antenna elements, and M is the number of digital beams per channel desired. Like frequency channels from each antenna element are input to Digital Beam Formation Unit (38A to 38N). For instance, the Digital Beam Formation Unit 38A corresponding to the first frequency channel inputs the first channel output from the Frequency Channelizer 36A (from the first antenna element 26A), the first channel output from the Frequency Channelizer 36B (from the second antenna element 26B), and so on, up to the first channel output from the Frequency Channelizer 36L (from the last antenna element 26L). Each Digital Beam Formation Unit (38A to 38N) then outputs M simultaneous digital beams, forming a total of M×N beams.

Figure 4:
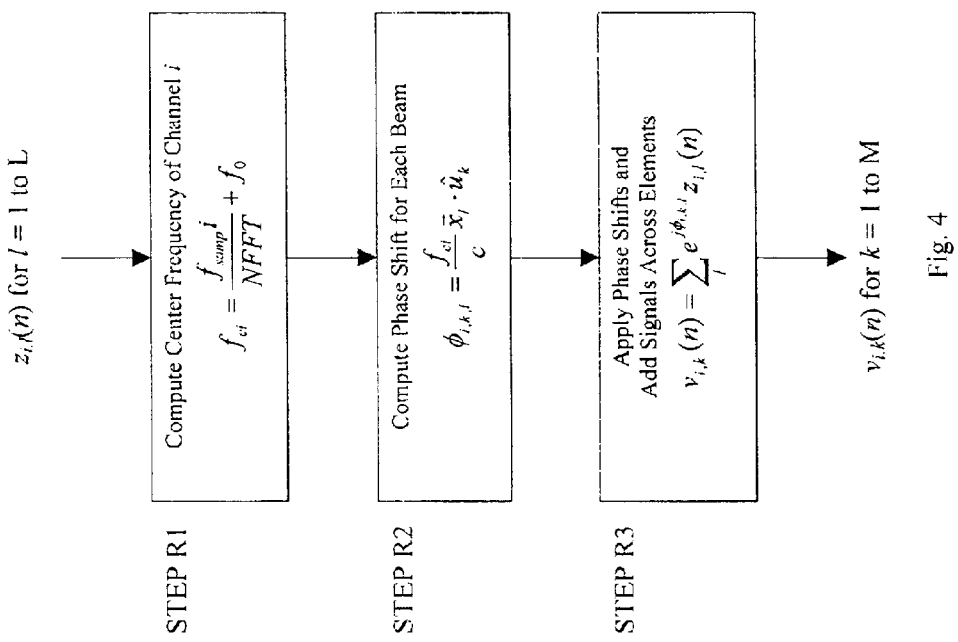
FIG. 4 is a flow chart of a digital beam formation system designed in accordance with the teachings of the present invention.

FIG. 4 is a flow chart of a Digital Beam Formation Unit 38 designed in accordance with the teachings of the present invention. The inputs to the i-th Digital Beam Formation Unit 38 are outputs $z_{i,l}(n)$ for l=1 to L from the L frequency channelizers (36A to 36L) corresponding to frequency channel i.

First, at Step R1, the center frequency $f_{ci}$ for channel i is computed:

$$f_{ci} = \frac{f_{samp} i}{NFFT} + f_0 \qquad [7]$$

where $f_{samp}$ is the sampling rate of the A/D converters, NFFT is the size of the FFT, and $f_0$ is the LO frequency.

At Step R2, the phase shifts $\phi_{i,k,l}$ for each receive beam k=1 to M and antenna element l=1 to L for channel i is computed:

$$\phi_{i,k,l} = \frac{f_{ci}}{c} \vec{x}_l \cdot \hat{u}_T \qquad [8]$$

where $\vec{x}_l$ is the position of antenna element l relative to the antenna array center, $\hat{u}_k$ is a unit vector along the k-th receive beam, and c is the speed of light.

At Step R3, the receive beams $v_{i,k}(n)$ for k=1 to M for channel i is computed by applying the phase shifts and adding signals across all elements:

$$v_{i,k}(n) = \sum_l e^{j\phi_{i,k,l}} z_{i,l}(n) \qquad [9]$$

where $z_{i,l}(n)$ is the output from the l-th frequency channelizer corresponding to frequency channel i.

These steps are repeated for all channels i=1 to N.

Alternatively, an FFT across elements may be performed when fine frequency channelization is performed and full beam coverage over the field of regard is required.

Each formed beam can then be processed as usual by a Radar, Communications, or EW Processing Unit (40A-1 to 40N–M). These systems are used primarily for radar, but can also be used for communications or EW (electromagnetic wave) applications.

Note that the digital radar implementation described here relaxes the dynamic range requirements of the D/A and the A/D. For example, to achieve —140 dB/Hz spectral purity with a 1000 element array and a 20% duty factor waveform a 4 bit D/A is sufficient. On receive for a similar size array, a 6 bit A/D is sufficient to achieve a dynamic range close to that of the linear amplifiers in active ESA systems.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A system for generating signals for driving the individual elements of an electronically scanned antenna array (ESA) comprising:

a signal generator for generating a first digital signal;

a digital beamsteering unit operating on said first digital signal to produce a second digital signal for each individual element of said antenna array; and serial memory buffers for storing said digital signals prior to conversion to analog.

2. The invention of claim 1 wherein said first digital signal is a series of waveform phase angles representing the phase angles of a common signal to be transmitted by said ESA.

3. The invention of claim 1 wherein said signal generator is a Direct Digital Synthesizer (DDS).

4. The invention of claim 1 wherein said second digital signal is a series of adjusted phase angles for each individual element of said antenna array.

5. The invention of claim 1 wherein said digital beamsteering unit includes means for adding a phase adjustment to said first digital signal for each individual element of said antenna array.

6. The invention of claim 5 wherein said phase adjustment $\gamma_l$ for antenna element 1 is computed from the equation $\gamma_l = 2\pi f_c t_{rl}$ where fc is the center frequency of the transmitted beam and $t_{rl}$ is the residual time for element 1.

7. The invention of claim 1 wherein said digital beamsteering unit includes means for adding a time delay to said first digital signal for each individual element of said antenna array.

8. The invention of claim 7 wherein said time delay tl for antenna element 1 is computed from the equation $$t_l = \frac{\vec{x}_l \cdot \hat{u}_T}{c}$$

where $\vec{U}_T$ is a unit vector along the transmit beam, $\vec{x}_l$ is the position of antenna element 1 relative to the antenna array center, and c is the speed of light.

9. The invention of claim 1 wherein said digital beamsteering unit is implemented in software.

10. The invention of claim 1 wherein said system further includes means for generating a third digital signal for each individual element of said antenna array wherein said third digital signal is a function of said second digital signal.

11. The invention of claim 10 wherein said function is cosine.

12. The invention of claim 10 wherein said function is implemented through the use of a look-up table.

13. The invention of claim 10 wherein said means for generating a third digital signal is implemented in software.

14. The invention of claim 1 wherein said system further includes means for converting said digital signals to analog.

15. The invention of claim 14 wherein said means for converting to analog includes a digital to analog (D/A) converter for each antenna element.

16. The invention of claim 15 wherein said system further includes an RF filter after each D/A converter.

17. A transmit system for an electronically scanned antenna array (ESA) radar system comprising:

a signal generator for generating a first digital signal;

a digital beamsteering unit operating on said first digital signal to produce a second digital signal for each individual element of said antenna array;

a program for generating a third digital signal for each antenna element wherein said third digital signal is a function of said second digital signal;

a serial memory buffer for each antenna element for storing said third digital signals;

a digital to analog (D/A) converter coupled to each serial memory buffer, an RF filter coupled to each D/A;

a power amplifier coupled to each RE filter; and a wideband circulator connecting each power amplifier to an antenna element of said antenna array.

* * * * *